(12) United States Patent
Kishiyama

(10) Patent No.: US 11,582,724 B2
(45) Date of Patent: Feb. 14, 2023

(54) USER EQUIPMENT, BASE STATION, COMMUNICATION ACCESS METHOD, AND COMMUNICATION METHOD

(71) Applicant: NTT DOCOMO, INC., Tokyo (JP)

(72) Inventor: Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 8 days.

(21) Appl. No.: 15/306,370

(22) PCT Filed: Apr. 21, 2015

(86) PCT No.: PCT/JP2015/062110
§ 371 (c)(1),
(2) Date: Oct. 24, 2016

(87) PCT Pub. No.: WO2015/166840
PCT Pub. Date: Nov. 5, 2015

(65) Prior Publication Data
US 2017/0048826 A1    Feb. 16, 2017

(30) Foreign Application Priority Data
Apr. 30, 2013  (JP) .............................. JP2014-094158

(51) Int. Cl.
*H04W 72/04* (2009.01)
*H04W 16/28* (2009.01)
(Continued)

(52) U.S. Cl.
CPC ........... *H04W 72/04* (2013.01); *H04W 16/28* (2013.01); *H04W 74/08* (2013.01);
(Continued)

(58) Field of Classification Search
CPC ...................................................... H04W 72/04
(Continued)

(56) References Cited

U.S. PATENT DOCUMENTS 9,544,111 B2 *   1/2017  Noh ..................... H04L 5/0048
2010/0275086 A1 * 10/2010  Bergquist .............. H04L 1/1887
                                                                714/748
(Continued)

FOREIGN PATENT DOCUMENTS

CN         101183896 A       5/2008
CN         102449921 A       5/2012
(Continued)

OTHER PUBLICATIONS

International Search Report issued in PCT/JP2015/062110, dated Jul. 14, 2015 (2 pages).
(Continued)

*Primary Examiner* — Shripal K Khajuria
(74) *Attorney, Agent, or Firm* — Osha Bergman Watanabe & Burton LLP

(57) ABSTRACT

In user equipment for communicating with a base station in a radio communication system including the base station and the user equipment, the user equipment includes a receiver that measures received power of reference signals associated with a plurality of different identification information items, the reference signals being transmitted from the base station, and that selects a specific reference signal based on a measurement result; and a transmitter that transmits a random access signal including a preamble sequence, the preamble sequence corresponding to the identification information item of the reference signal selected by the receiver.

7 Claims, 7 Drawing Sheets

(51) Int. Cl.
*H04W 74/08* (2009.01)
*H04B 7/06* (2006.01)
*H04W 72/12* (2023.01)
*H04W 88/02* (2009.01)
*H04W 88/08* (2009.01)

(52) U.S. Cl.
CPC ....... *H04W 74/0833* (2013.01); *H04B 7/0617* (2013.01); *H04W 72/1284* (2013.01); *H04W 88/02* (2013.01); *H04W 88/08* (2013.01)

(58) Field of Classification Search
USPC .......................................................... 370/329
See application file for complete search history.

(56) References Cited

U.S. PATENT DOCUMENTS

| | | | |
|---|---|---|---|
| 2013/0016656 A1* | 1/2013 | Satou ............... | H04W 74/0891 370/328 |
| 2013/0148536 A1* | 6/2013 | Frenger ................ | H04L 5/0035 370/252 |
| 2014/0092855 A1* | 4/2014 | Ahn .................. | H04W 74/0833 370/329 |
| 2014/0349645 A1* | 11/2014 | Webb .................... | H04L 5/0091 455/435.1 |
| 2014/0362757 A1 | 12/2014 | Chang et al. | |
| 2015/0009054 A1 | 1/2015 | Ono et al. | |
| 2015/0055618 A1 | 2/2015 | Takaoka et al. | |
| 2016/0135227 A1* | 5/2016 | Hahn .................... | H04W 24/02 370/329 |
| 2016/0157267 A1* | 6/2016 | Frenne .............. | H04W 74/0833 370/329 |
| 2019/0132850 A1* | 5/2019 | Sun ..................... | H04W 72/005 |
| 2021/0368548 A1 | 11/2021 | Pelletier et al. | |

FOREIGN PATENT DOCUMENTS

| | | |
|---|---|---|
| JP | 2009-065509 A | 3/2009 |
| JP | 2013-183299 A | 9/2013 |
| JP | 2013219507 A | 10/2013 |
| JP | 2013-236327 A | 11/2013 |
| JP | 2014045497 A | 3/2014 |
| JP | 2015505207 A | 2/2015 |
| JP | 2017-516348 A | 6/2017 |
| WO | 2013/015636 A2 | 1/2013 |
| WO | 2013111888 A1 | 8/2013 |
| WO | 2014/007546 A1 | 1/2014 |
| WO | 2015/147717 A1 | 10/2015 |

OTHER PUBLICATIONS

Written Opinion of the International Searching Authority issued in PCT/JP2015/062110, dated Jul. 14, 2015 (4 pages).
Notification of Reasons for Refusal issued in counterpart Japanese Patent Application No. 2016-516326, dated Mar. 12, 2019 (10 Pages).
Office action issued in counterpart Chinese Patent Application No. 201580022153.9, dated Mar. 25, 2019 (19 Pages).
Office action issued in counterpart Japanese Patent Application No. 2016-516326, dated Jun. 4, 2019 (11 pages).
Kyocera Corp.; "PRACH-based UE proximity detection for ES overlaid coverage scenario"; 3GPP TSG RAN WG3 Meeting #83, R3-140294; Prague, Czech Republic; Feb. 10-14, 2014 (8 pages).
Office action issued in counterpart Japanese Patent Application No. 2016-516326, dated Aug. 27, 2019 (9 pages).
Office action issued in counterpart Chinese Patent Application No. 201580022153.9, dated Oct. 14, 2019 (11 pages).
Reconsideration Report by Examiner before Appeal issued in Japanese Application No. 2016-516326; dated Jan. 14, 2020 (9 pages).
Office Action issued in Chinese Application No. 201580022153.9, dated May 7, 2020 (10 pages).
Decision of Refusal issued in Japanese Application No. 2019-214633; dated Mar. 9, 2021 (2 pages).
Decision of Dismissal of Amendment issued in Japanese Application No. 2019-214633; dated Mar. 9, 2021 (6 pages).
Trial and Appeal Decision issued in Japanese Patent Application No. 2016-516326, mailed on Oct. 6, 2020 (40 pages).
Office Action issued in the counterpart Japanese Patent Application No. 2019-214633, dated Nov. 10, 2020 (10 pages).
Kyocera Corp.; "PRACH-based UE proximity detection for ES overlaid coverage scenario"; 3GPP TSG RAN WG3 Meeting #83, R3-140294; Prague, Czech Republic; Feb. 10-14, 2014 (7 pages).
Office Action issued in counterpart Chinese Application No. 201780098168.2 dated Jun. 25, 2021 (18 pages).
Office action issued in counterpart Japanese Patent Application No. 2021-096576, dated Jun. 14, 2022 (6 pages).

* cited by examiner

USER EQUIPMENT, BASE STATION, COMMUNICATION ACCESS METHOD, AND COMMUNICATION METHOD

TECHNICAL FIELD

The present invention relates to a base station and user equipment of a radio communication system.

BACKGROUND ART

For the LTE/LTE-Advanced, the MIMO technology has been adopted that enhances system capacity, a cell edge user throughput, and so forth. Additionally, the heterogeneous network technology has been adopted that achieves high quality communication by reducing inter-cell interference, while allowing different types of base stations (e.g., macro cells and small cells) to coexist.

Especially, it is assumed, for a small cell in the heterogeneous network, that a high frequency band is to be used. Here, since propagation loss increases for the high frequency band, in order to compensate for this, it has been studied to adopt the massive MIMO for implementing beam forming with a narrow beam width.

The massive MIMO is the large-scale MIMO where a large number of antennas (e.g., 100 elements) are used, and the massive MIMO can cause the electric field intensity to be concentrated in a narrow region, so that interference between users can be reduced.

Furthermore, for the heterogeneous network, in order to compensate for the propagation loss in the high frequency band, it has been studied to implement beam forming using a plurality of antennas, not only for a downlink, but also for an uplink.

PRIOR ART DOCUMENT

Patent Document

Patent Document 1: Japanese Unexamined Patent Publication No. 2013-219507

SUMMARY OF INVENTION

For the existing LTE/LTE-Advanced, however, no random access signal (PRACH: Physical Random Access Channel) is defined that is suitable for use in the above-described heterogeneous network. Consequently, with the existing technology, a base station is not able to efficiently determine, for example, for user equipment that transmits the PRACH to access the base station that forms a plurality of downlink beams, as to which beam is the beam that results in a favorable reception quality.

The present invention is achieved in view of the above-described point, and an object is to provide technology that allows, in a radio communication system including a base station that implements beam forming and user equipment, the base station to efficiently determine a favorable beam.

According to one or more embodiments of the present invention, there is provided user equipment for communicating with a base station in a radio communication system including the base station and the user equipment, the user equipment including a receiver that measures received power of reference signals associated with a plurality of different identification information items, the reference signals being transmitted from the base station, and that selects a specific reference signal based on a measurement result; and a transmitter that transmits a random access signal including a preamble sequence, the preamble sequence corresponding to the identification information item of the reference signal selected by the receiver.

Furthermore, according to one or more embodiments of the present invention, there is provided a base station for communicating with user equipment in a radio communication system including the base station and the user equipment, the base station including a transmitter that transmits reference signals associated with a plurality of different identification information items; and a receiver that receives, from the user equipment, a random access signal including a preamble sequence, the preamble sequence corresponding to an identification information item of a specific reference signal received by the user equipment, wherein the transmitter transmits, to the user equipment, a control signal based on the identification information item obtained from the random access signal received by the receiver.

According to one or more embodiments of the present invention, the technology can be provided that allows, in a radio communication system including a base station that implements beam forming and user equipment, the base station to efficiently determine a favorable beam.

EMBODIMENTS OF THE INVENTION

Figure 1:
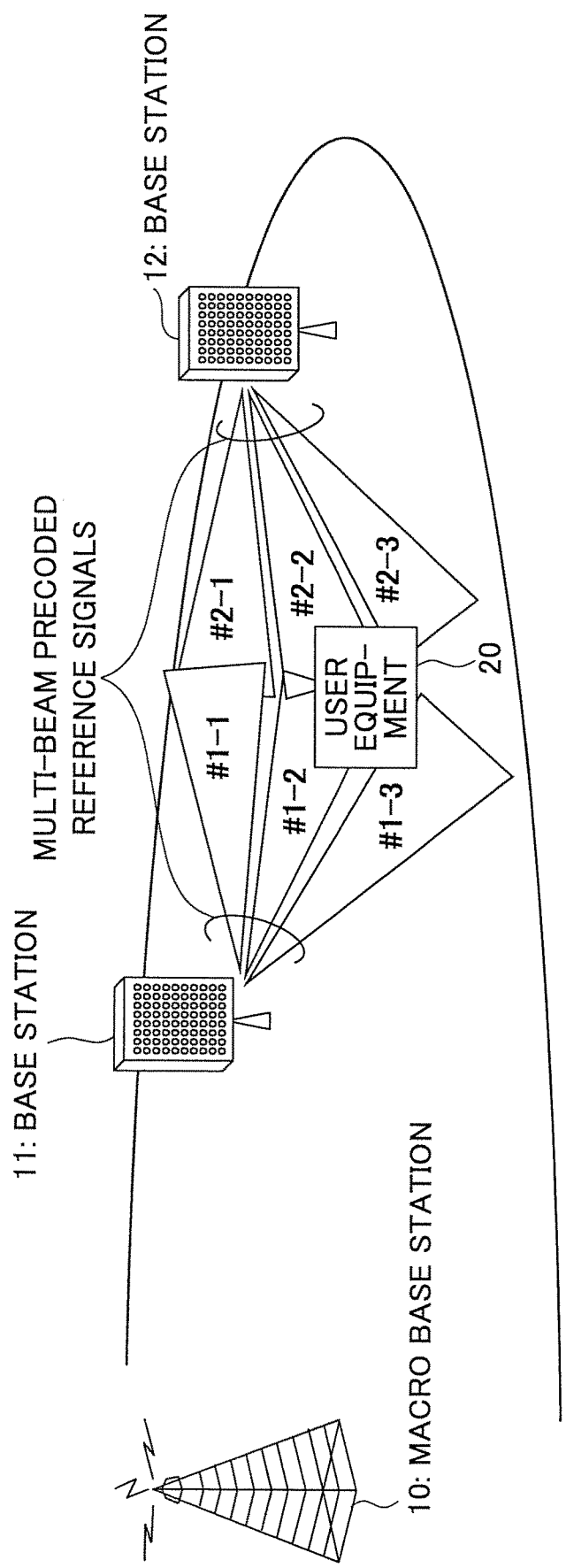
FIG. 1 is an overall configuration diagram of a radio communication system according to one or more embodiments of the present invention.

An embodiment of the present invention is described below by referring to the drawings. Note that the embodiment described below is merely an example, and embodiments to which the present invention is applied are not limited to the embodiment below. For example, it is assumed that a radio communication system according to the embodiment is a system based on a scheme that conforms to the LTE, and that the OFDM is used for the downlink and the SC-FDMA is used for an uplink; however, the present invention is not limited to this, and, for example, the OFDM may be used for both uplink and downlink. Furthermore, the present invention can be applied to a scheme other than the LTE. Note that, in the present specification and claims, "LTE" is used in a broad sense including, not only a communication scheme corresponding to Release 8 or 9 of the 3GPP, but also a communication scheme corresponding to Release 10, 11, or 12 of the 3GPP, or after that.

(System Configuration)

FIG. 1 illustrates an overall configuration diagram of a radio communication system according to one or more embodiments of the present invention. The radio communication system according to one or more embodiments of the present invention includes a macro base station 10 that forms a macro cell; and base stations 11 and 12 that are located within a coverage area of the macro cell. Additionally, in FIG. 1, user equipment 20 is illustrated that communicates with the macro base station 10 and the base stations 11 and 12.

The radio communication system adopts a configuration such that macro coverage is reserved by the macro base station 10 in a low frequency band, and traffic in a small area (e.g., a hot spot) is absorbed by the base stations 11 and 12 in a high frequency band; however, such an allocation of frequency bands is merely an example, and it is not limited to this.

In one or more embodiments of the present invention, the base stations 11 and 12 are provided with functions of the massive MIMO, respectively, so that various types of beams can be formed, which are from broad beams to narrow beams. As illustrated in FIG. 1, in one or more embodiments of the present invention, a plurality of precoded reference signals (which are referred to as "discovery signals" in the embodiments) is transmitted, from the base stations 11 and 12, through respective beams (a plurality of antenna ports). For the example of transmission, the fact that the reference signal is precoded means that, for each antenna port, a transmit signal is multiplied by a weight, so that the reference signal is transmitted by a beam with a certain width (i.e., with directivity). For example, in the example illustrated in FIG. 1, discovery signals are transmitted from the base station 12 through a beam 2-1, a beam 2-2, and a beam 2-3, respectively. Note that, in FIG. 1, the configuration is illustrated where the macro base station 10 exists; however, a configuration may be adopted where the macro base station 10 does not exist.

Additionally, the beams formed by the base stations 11 and 12 may be hierarchical. For example, the base stations 11 and 12 may form, within each beam illustrated in FIG. 1, a plurality of narrow beams. As an example, for a case where the user equipment 20 receives, among the plurality of beams illustrated in FIG. 1, the beam #2-2 with the highest received power, the user equipment 20 can operate in such a manner that, by receiving reference signals transmitted through a plurality of narrower beams in the beam #2-2 (belonging to the beam #2-2), the most favorable beam is selected among the plurality of narrow beams.

Furthermore, the base stations 11 and 12 can form, also at the receiving side, the beams as illustrated in FIG. 1, and hierarchical beams, as described above. To form the beams at the receiving side means that, for each antenna port, a received signal is multiplied by a weight, so that the signal is received through a beam with a certain beam width (i.e., with directivity).

A discovery signal includes an identification information item for identifying the discovery signal. The identification information items identifies the discovery signal, and also identifies a beam, so that it is referred to as a beam ID, hereinafter. The user equipment 20 measures received power of each discovery signal transmitted from the base stations 11 and 12 (beam search); and the user equipment 20 operates to transmit a PRACH including a preamble sequence (preamble sequence) corresponding the beam ID of the discovery signal that is received with the highest received power. The details of operation including this operation are described below. Note that a quantity measured at the beam search is not limited to the received power, and it may be another quantity (e.g., reception quality). Additionally, the received power and another quantity may be collectively referred to as the reception quality.

(With Regard to the User Equipment 20)

The user equipment 20 according to one or more embodiments of the present invention can simultaneously communicate, for example, with the macro base station 10 that forms the macro cell (e.g., a PCell), and the base stations 11 and 12 that form small cells (e.g., SCells) by applying carrier aggregation; and the user equipment can also communicate only with a single base station.

Further, the user equipment 20 in one or more embodiments of the present invention may include a plurality of antennas, and may include a function to execute uplink MIMO transmission. Namely, the user equipment 20 can execute uplink beam forming, and uplink multiple rank transmission. However, in one or more embodiments of the present invention, is not mandatory to execute transmission by using a plurality of antennas for the uplink.

Here, for user equipment (UE), in general, it can be considered that user equipment including a single antenna may be used in many cases in the future, depending on usage. Examples are low-cost MTC terminals and so forth. At the same time, it can be considered that user equipment including a MIMO transmission function with approximately four antennas becomes the mainstream.

Figure 2:
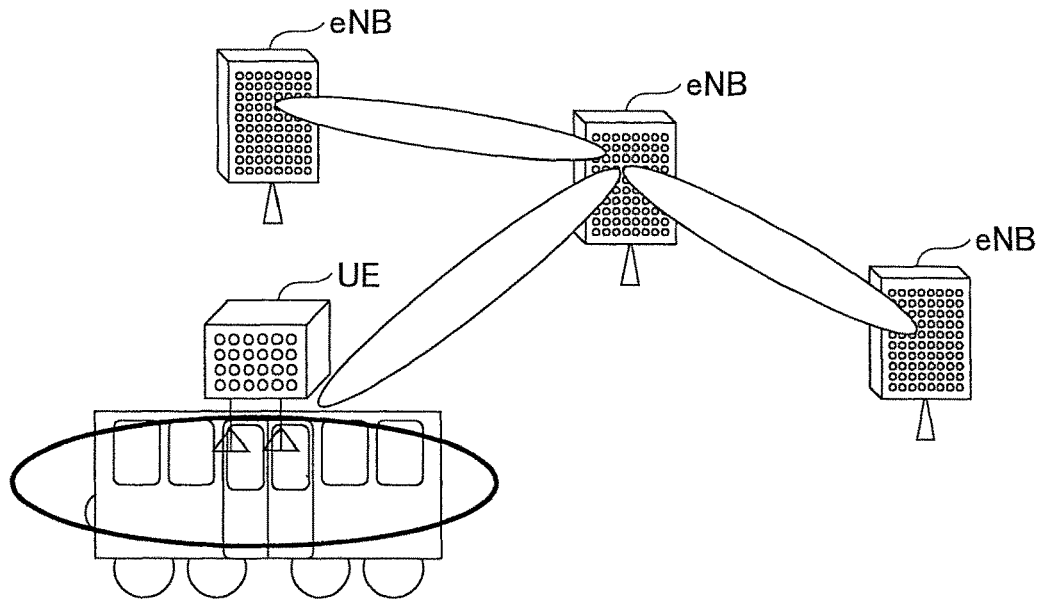
FIG. 2 is a diagram illustrating an application example of user equipment implementing beam forming according to one or more embodiments of the present invention.

Furthermore, it can be considered that, depending on usage, user equipment including a Massive MIMO function with 16 or more antennas may be used. As for such user equipment, as illustrated in FIG. 2, for example, a communication device that is to be installed in a means of public transportation, such as a train, user equipment with a role of a relay device in the backhaul of communication between base stations, and so forth, can be considered.

(With Regard to the PRACH)

Next, a PRACH is described that is to be transmitted by the user equipment 20 in the uplink in one or more embodiments of the present invention. Note that, the PRACH is a channel for transmitting a preamble sequence during initial access to a base station; however, for the PRACH, an expression "transmit the PRACH" may be used in the meaning that the PRACH is a signal including the preamble sequence. The PRACH may also be referred to as a "random access signal."

The PRACH in one or more embodiments of the present invention is a channel to be transmitted when the user equipment 20 executes searching for beams transmitted from the base stations 11 and 12, and when the user equipment 20 initially accesses the base stations 11 and 12, after detecting the beam with the highest received power.

In one or more embodiments of the present invention, for example, the PRACH includes a scheduling request function; and the base station that receives the PRACH operates to allocate, to the user equipment 20, a radio resource for uplink data transmission, and to transmit, to the user equipment 20, the allocation information (UL grant) through the EPDCCH (or the PDCCH, which is assumed to be the EPDCCH, hereinafter). Note that, for example, for a case where the FDD is to be applied, the resource to be applied is a time-frequency resource, such as a resource block; and for a case where the TDD is to be applied, the resource to be applied is a resource, such as a UL subframe. Additionally, a measurement report (measurement report, which includes the received power, the reception quality, and so forth) may be transmitted through the PRACH.

As described above, in one or more embodiments of the present invention, discovery signals to be transmitted through respective beams from the base stations 11 and 12, which are illustrated in FIG. 1, each includes a beam ID associated with the beam.

In one or more embodiments of the present invention, the beam IDs are associated with the preamble sequences in advance; and the user equipment 20 maintains the information on the association between the beam IDs and the preamble sequences (the information indicating which beam ID corresponds to which preamble sequence). The information on the association may be the information to be signaled, in advance, from the macro base station 10 to the user equipment 20, or the information that is to be maintained by the user equipment 20 by another method. Additionally, each of the base stations 11 and 12 maintains, at least, information on the association between the beam ID, which is to be used by the base station itself, and the preamble sequence.

As a result of performing a beam search, the user equipment UE transmits a PRACH including a preamble sequence corresponding to the beam ID of the discovery signal with the highest received power.

Further, in one or more embodiments of the present invention, a resource (e.g., a frequency position) to be used for transmitting the PRACH is associated with the user equipment, and each user equipment maintains, in advance, the information on the resource for transmitting the PRACH, which corresponds to the user equipment itself. Additionally, each of the base stations 11 and 12 maintains, in advance, the information on the association between the resource for receiving the PRACH (which is the resource for sending when it is viewed from the user equipment) and the user equipment identification information, so that each of the base stations 11 and 12 can recognize, from the receiving resource of the PRACH that has been received (the PRACH with which the preamble sequence has been obtained), the user equipment identification information of the user equipment that is the sender of the PRACH, and after that, each of the base stations 11 and 12 can transmit a control signal, such as the EPDCCH, to the user equipment. The above-described user equipment identification information can be, for example, the UE-ID (e.g., the C-RNTI), or the UE-specific VCID; however, it is not limited to these.

Figure 3:
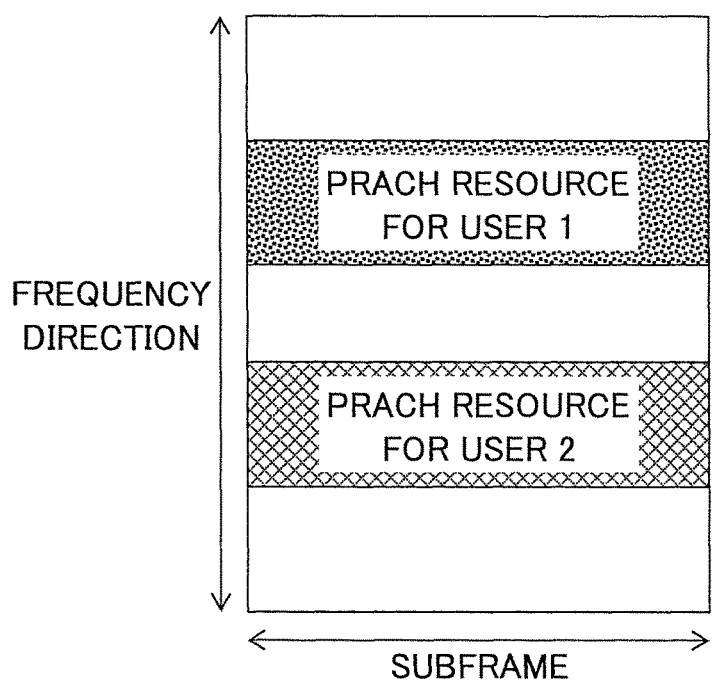
FIG. 3 is a diagram illustrating an example of mapping of a PRACH according to one or more embodiments of the present invention.

FIG. 3 illustrates an example of a resource for transmitting the PRACH. In the example of FIG. 3, a PRACH resource for a user 1 is allocated to a certain frequency band of a specific subframe, and a PRACH resource for a user 2 is allocated to another frequency band.

(Operation Example of the Radio Communication System)

Figure 4:
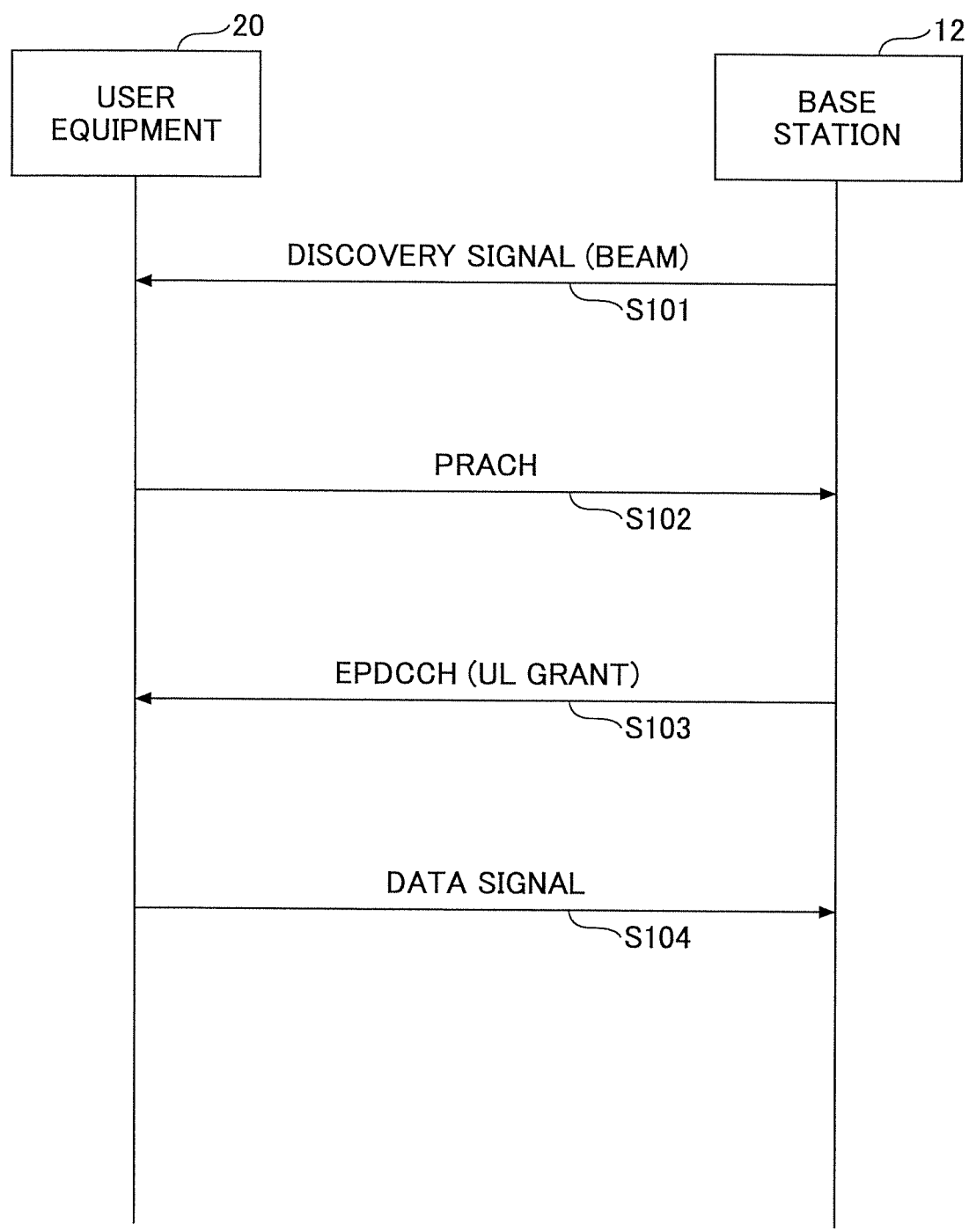
FIG. 4 is a sequence diagram illustrating an example of an operation of the radio communication system according to one or more embodiments of the present invention.

Next, an operation example of the radio communication system (the radio communication system illustrated in FIG. 1) according to one or more embodiments of the present invention is described by referring, mainly, to FIG. 4. In the example illustrated in FIG. 4, since the user equipment 20 receives the discovery signal transmitted from the base station 12 with the highest received power, FIG. 4 illustrates the base station 12 out of the base station 11 and the base station 12.

Figure 5:
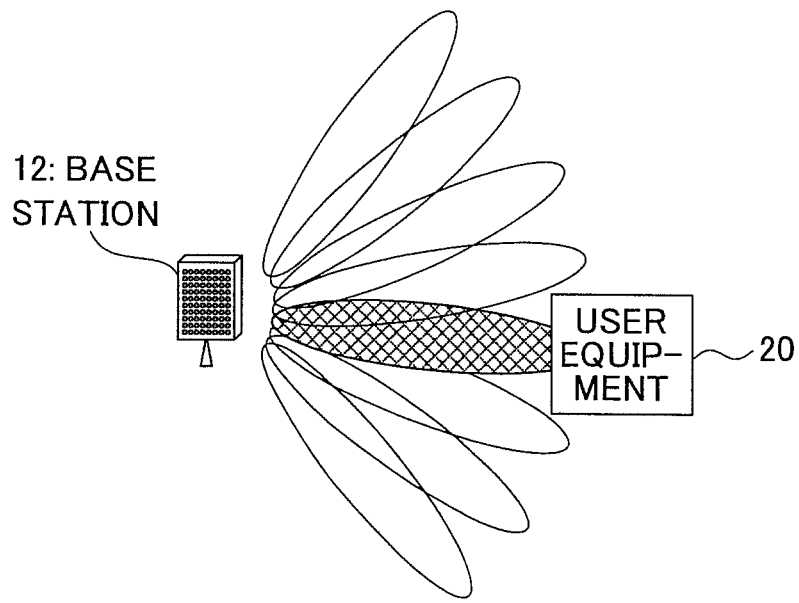
FIG. 5 is a diagram illustrating a beam search by user equipment 20 at step S101 of FIG. 4.

As described above, the base station 12 transmits the plurality of precoded discovery signals (=the reference signals associated with the respective different identification information items) forming the beam (step 101). The user equipment 20 measures, for example, for each discovery signal which may be received, the received power (this operation may be referred to as monitoring); and the user equipment 20 detects (receives) a specific discovery signal (one or more). Note that, since a beam is formed by one or more antenna ports, each beam can be associated with the one or more antenna ports. FIG. 5 illustrates an image of step 101. As illustrated in FIG. 5, the base station 12 transmits, through a plurality of beams, a plurality of discovery signals, each including a respective different beam ID. For a case where the above-described hierarchy is to be formed, the beam to be formed here can be a broad beam (the beam that is broader than narrow beams belonging to it).

At step 101, instead of monitoring all the discovery signals that may be received, the user equipment may narrow down candidates by receiving auxiliary information (which is referred to as macro auxiliary information) from the macro base station 10, and the user equipment 20 may detect the discovery signal transmitted from the base station 12. The macro auxiliary information includes transmission timing, sequence information, a beam ID, and so forth of the discovery signal within the coverage of the macro cell.

In this case, since the user equipment 20 recognizes the transmission timing and the beam ID of each of the discovery signals based on the macro auxiliary information received from the macro base station 10, by monitoring narrowed down candidates by using these, the user equipment 20 receives each of the discovery signals transmitted from the base station 12.

In one or more embodiments of the present invention, the base station 12 may transmit the synchronization signal (e.g., PSS/SSS) separately from the discovery signal; or the discovery signal may have a function of the synchronization signal. For a case where the discovery signal has the function of the synchronization signal, the user equipment 20 can achieve, by receiving the discovery signal, frequency synchronization and timing synchronization (e.g., symbol synchronization and frame synchronization) with the base station 12. Furthermore, by the discovery signal, information required for communication in the coverage of the base station 12 (e.g., the minimum system information) may be received. For a case where the synchronization signal is received separately from the discovery signal, after achieving the frequency synchronization and the timing synchronization by the synchronization signal, the discovery signal is received.

Further, the user equipment 20 identifies the beam ID of the discovery signal with the highest received power, based on the measurement result of the received power. Note that, instead of identifying one beam ID with the highest received power, a predetermined number of beam IDs may be identified in a descending order.

Subsequently, the user equipment 20 transmits the PRACH (step 102 of FIG. 4). In this example, the base station 12 receives the PRACH. As described above, the PRACH includes the preamble sequence associated with the beam ID of the beam with the large received power, which is identified in the above-described manner. Further, the PRACH is transmitted by the resource associated with the user equipment 20.

Figure 6:
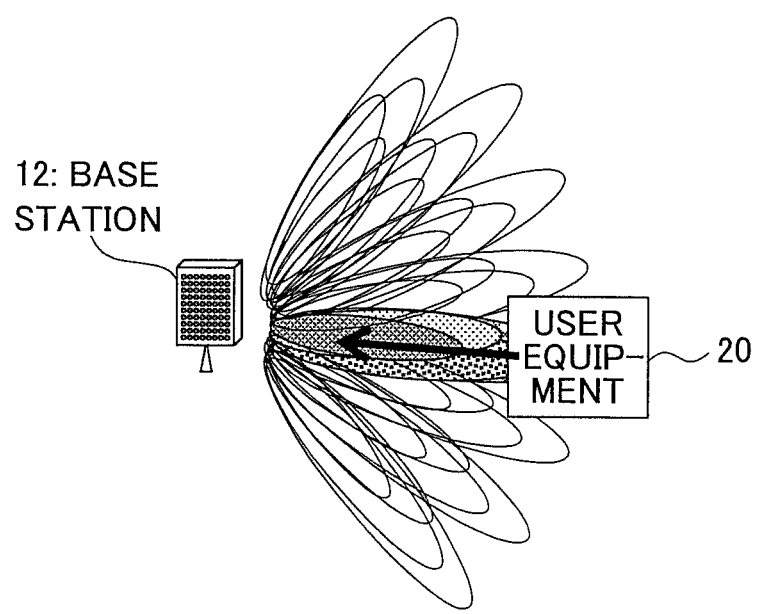
FIG. 6 is a diagram illustrating PRACH reception by a base station 12 at step S102 of FIG. 4.

FIG. 6 illustrates an image of receiving, at step 102, the PRACH by the base station 12. As illustrated in FIG. 6, the base station 12 receives the PRACH by using a beam that is narrower than the beam for the transmission, which is illustrated in FIG. 4.

Here, since the PRACH includes a preamble sequence corresponding to the beam ID, the base station 12 detects the beam ID in the received PRACH; and the base station 12 identifies, among a plurality of narrow beams belonging to the beam corresponding to the beam ID (the broad beam), the beam with which the PRACH is received with the highest received power. For example, for a case where the beam ID is "1," the received power is measured for each of the plurality of narrow beams belonging to the received beam (which is in the direction opposite to the transmission) corresponding to the transmit beam with "1," and the beam is identified with which the PRACH is received with the highest received power.

Note that, in this operation example, it is assumed that the TDD is applied. Namely, by the reciprocity, when a beam in a specific direction toward the user equipment is a favorable beam, it can be estimated that the beam that is obtained by reversing the direction (directed to the base station) is also a favorable beam. However, even for the FDD, the method described in this operation example can be applied. The reason is that, in the FDD, even if the frequencies are different in the uplink and downlink, for a favorable beam in the downlink direction, the uplink beam obtained by reversing it can be estimated to be a favorable beam.

In this manner, by including, in the PRACH, the preamble sequence corresponding to the beam ID, the base station 12 can quickly recognize a beam that is favorable for the user equipment 20, and the base station 12 can properly narrow down the more narrower beam candidates.

Further, the base station 12 obtains, from the receiving resource of the PRACH received at step 102, the user equipment identification information of the user equipment 20, which is the sender that transmits the PRACH. Namely, the base station 12 maintains, in a storage unit, correspondence information between the PRACH resource and the user equipment identification information; and the base station 12 obtains the user equipment identification information corresponding to the receiving resource of the PRACH.

Figure 7:
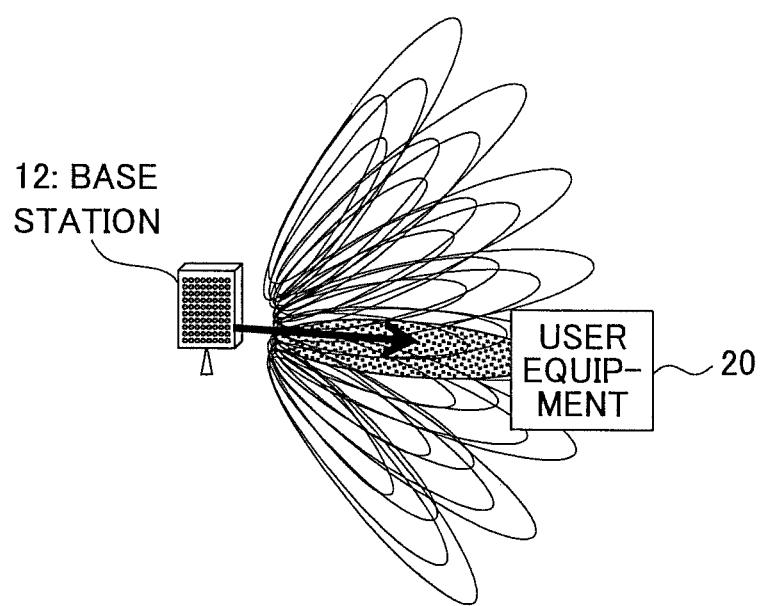
FIG. 7 is a diagram illustrating EPDCCH transmission by the base station 12 at step S103 of FIG. 4.

Subsequently, at step 103 of FIG. 4, the base station 12 allocates a UL resource to the user equipment 20; and the base station 12 transmits the UL grant including the allocation information (e.g., an RB) to the user equipment through the EPDCCH by using the narrow beam in the direction opposite to the direction of the identified narrow beam. Transmitting the EPDCCH to the user equipment 20 means to transmit the EPDCCH (a control signal) including the user equipment identification information. FIG. 7 illustrates a situation in this case.

After step 103, the user equipment 20 transmits UL data by using the allocated resource.

Note that, in the above-described example, it is assumed that the base station 12 transmits the discovery signal by the broad beam, that the base station 12 identifies the narrow beam during receiving the PRACH, and that the base station 12 transmits the EPDCCH by the beam that is opposite to the narrow beam; however, the base station 12 may transmit the EPDCCH by using a beam corresponding to the beam with the beam ID, which is identified by the PRACH. Namely, the EPDCCH may be transmitted by a beam with a width that is the same as that of the discovery signal.

For using the PRACH as a scheduling request, information on the size of the UL data may be included in the preamble sequence of the PRACH. Depending on this size, the base station 12 can adjust the amount of the resource to be allocated to the user equipment 20. Further, reception quality information (e.g., the CQI) may be included in the PRACH. This CQI may be rough compared with the CQI that is used for normal reporting of the CQI. By transmitting the CQI in this manner, the base station 12 can transmit the EPDCCH by using a proper MCS. In the examples so far, the user equipment 20 transmits the PRACH by not using a beam; however, the user equipment 20 may transmit the PRACH by using a plurality of beams.

(With Regard to the Signal Mapping to the CCs During Carrier Aggregation)

The user equipment 20 can execute communication with the base station 12 by carrier aggregation (CA), by using a plurality of component carriers (CCs) (the same for the base station 11).

In one or more embodiments of the present invention, for example, for the downlink, the PDSCH, the EPDCCH, the CSI-RS, and so forth are transmitted from the base station by each CC (all CCs); and, for the uplink, the PUSCH, the PUCCH, and the SRS (the sounding reference signal) are transmitted by each CC (all CCs).

Further, the synchronization signal (e.g., PSS/SSS), the downlink reference signals (the discovery signals of the embodiments), and the PRACH may be transmitted by all the CCs, or by one CC.

Figure 8:
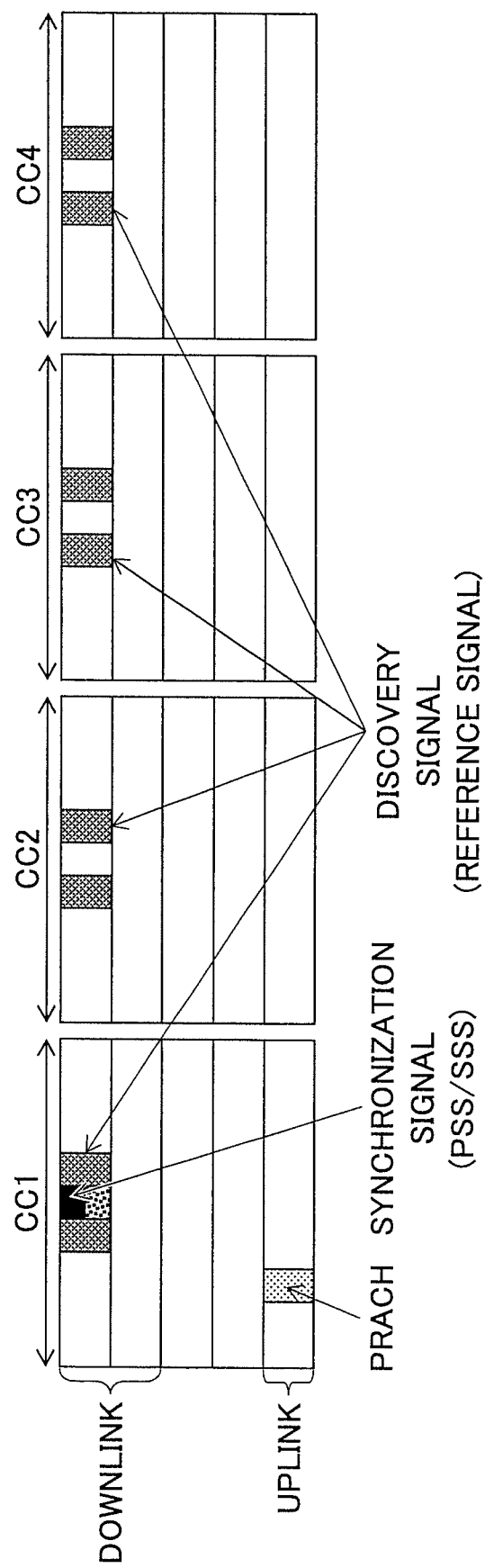
FIG. 8 is a diagram illustrating an example of signal mapping during carrier aggregation according to one or more embodiments of the present invention.

FIG. 8 illustrates an example of signal mapping to the CCs during the carrier aggregation. Note that, FIG. 8 is an example of the TDD where the uplink and downlink are time divided; however, the same mapping is possible, even for the FDD. For the case of FDD, it can be viewed, in FIG. 8, that the frequencies of the CCs are different for the uplink and downlink.

In the example of FIG. 8, the PRACH is transmitted by the CC1, which is a single CC; and the CCs 2, 3, and 4, which are the other CCs forming the carrier aggregation, do not transmit the PRACH. Further, the synchronization signal (PSS/SSS) is transmitted by the CC1, which is the single CC; and it is not transmitted by the CCs 2, 3, and 4, which are the other CCs forming the carrier aggregation. Further, the downlink reference signals (the discovery signals in the embodiments) are transmitted by all the CCs.

In this manner, by transmitting, by only one CC, only the signals that are used at an initial stage for executing communication of the base station 12 (e.g., the synchronization signal and the PRACH), the subsequent process can be quickly executed.

(Device Configuration)

Next, for the user equipment 20 and the base station 12, which are described so far, examples of the configurations are described. Since the configurations are the same for the base stations 11 and 12, the configuration of the base station 12 is described, as a representative. A configuration of each device described below illustrates the configuration that is particularly related to one or more embodiments of the present invention, and each device includes functions of the user equipment/base station that can execute operations conforming to the LTE, for example.

Figure 9:
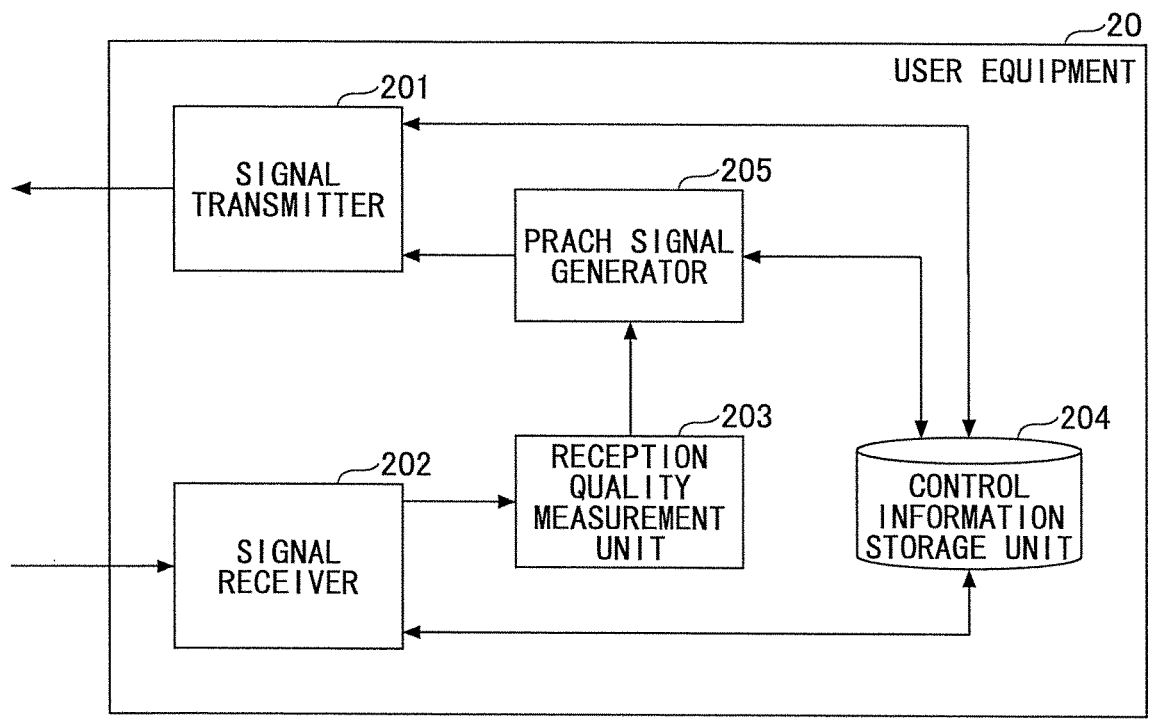
FIG. 9 is a functional configuration diagram of the user equipment 20 according to one or more embodiments of the present invention.

FIG. 9 illustrates a functional configuration diagram of the user equipment 20. The user equipment 20 includes a signal transmitter 201; a signal receiver 202; a reception quality measurement unit 203; a control information storage unit 204; and a PRACH signal generator 205.

The signal transmitter 201 generates a lower layer signal from upper layer information, and transmits it by radio. The signal receiver 202 obtains, from the lower layer signal received by radio, the upper layer information.

Further, the signal receiver 202 receives control information from the base station 12 and the macro base station 10; stores it in the control information storage unit 204; and, at the same time, performs receiving operations based on the control information. For example, a downlink allocated resource can be received as the control information, and the receiving operation can be performed in accordance with the control information.

The control information storage unit 204 stores various types of control information received from the base station 12 and the macro base station 10. As the control information, there are information on the correspondence between the beam ID and the preamble sequence, and the resource information for the PRACH transmission, for example.

The reception quality measurement unit 203 measures reception quality (e.g., the received power, the CQI, and the rank) of the discovery signals received by the signal receiver 202, and passes the measurement results to the PRACH signal generator 205.

The PRACH signal generator 205 identifies the beam ID of the discovery signal with high received power from the measurement results obtained from the discovery signals of the respective beams; generates a preamble sequence corresponding to the beam ID; and passes it to the signal transmitter 201. The signal transmitter 201 transmits the PRACH including the preamble sequence by using a resource associated with the user equipment 20. Further, as described above, the PRACH may include the UL data amount, the CQI, and so forth.

Further, the signal transmitter 201 executes uplink data transmission in accordance with the control information (e.g., the UL allocation information) that is received by the signal receiver 202 and that is stored in the control information storage unit 204.

Figure 10:
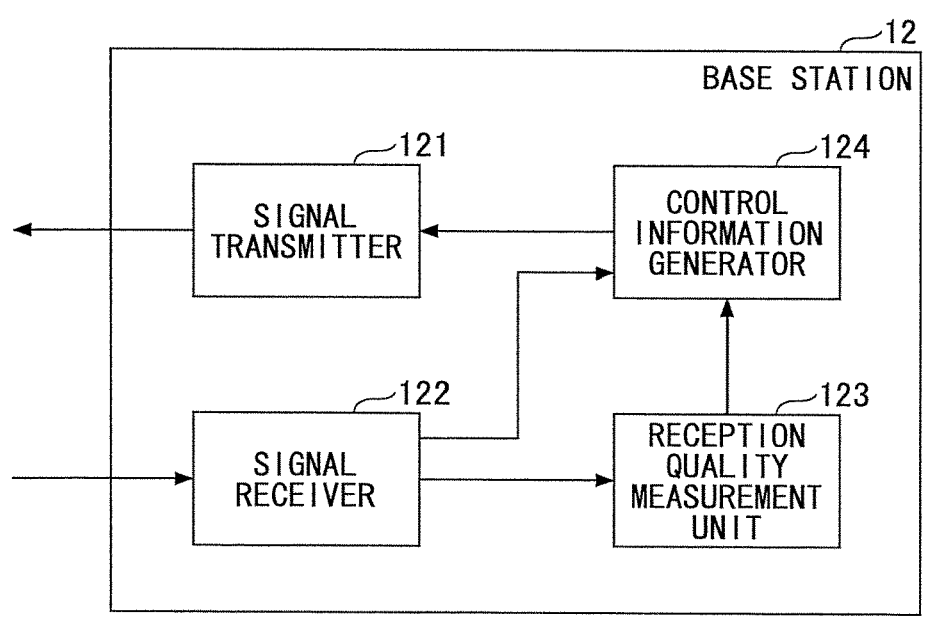
FIG. 10 is a functional configuration diagram of the base station 12 according to one or more embodiments of the present invention.

FIG. 10 illustrates a functional configuration diagram of the base station 12. As illustrated in FIG. 10, the base station 12 includes a signal transmitter 121; a signal receiver 122; a reception quality measurement unit 123; and a control information generator 124.

The signal transmitter 121 generates a lower layer signal from upper layer information, and transmits it by radio. The signal receiver 122 obtains the upper layer information from the lower layer signal received by radio.

The signal receiver 122 receives the PRACH transmitted from the user equipment 20; and, at the same time, the signal receiver 122 obtains a preamble sequence, and obtains a beam ID associated with the preamble sequence. Further, the signal receiver 122 obtains the user equipment identification information associated with the resource with which the PRACH is received. The correspondence information required for each of the above-described processes (preamble-beam ID, and resource-user equipment identification information) is stored in the storage unit of the base station 12; and the signal receiver 122 reads out necessary information from the storage unit.

The received quality measurement unit 123 measures, for each PRACH (for each user equipment), and for each narrow beam belonging to a wide beam corresponding to the beam ID, received power of the PRACH (which may be reception quality other than the received power); identifies the narrow beam with the highest received power; and passes the information to the control information generator 124.

The control information generator 124 obtains allocation information by executing resource allocation to the user equipment; and generates control information including the allocation information and the above-described user information identification. Then, the control information is passed to the signal transmitter 121, and the signal transmitter 121 is instructed to transmit a control signal including the control information (e.g., the EPDCCH) through the identified narrow beam; and the signal transmitter 121 transmits the control signal through the narrow beam.

Note that the configurations (functional division) illustrated in FIG. 9 and FIG. 10 are merely an example. The implementation method (specific arrangement of functional units) is not limited to a specific implementation method, provided that the process described in the embodiments can be implemented. For example, the user equipment and the base station according to one or more embodiments of the present invention may also be configured as devices formed of the units described below.

Namely, the user equipment in one or more embodiments of the present invention can be configured as user equipment for communicating with a base station, in a radio communication system including the base station and the user equipment, the user equipment including a receiver that measures received power of reference signals associated with a plurality of different identification information items, the reference signals being transmitted from the base station, and that selects a specific reference signal based on a measurement result; and a transmitter that transmits a random access signal including a preamble sequence, the preamble sequence corresponding to the identification information item of the reference signal selected by the receiver. With this configuration, for example, in the radio communication system including the base station that implements beam forming and the user equipment, the base station can efficiently determine a favorable beam.

The transmitter can transmit the random access signal by using a radio resource associated with the user equipment. With such a configuration, the base station can quickly recognize the user equipment that is a sender of the random access signal.

Further, the random access signal may include an amount of data to be transmitted by the user equipment in an uplink, and the random access signal may be transmitted to the base station, as a scheduling request. By transmitting the random access signal as the scheduling request, the user equipment can start uplink data transmission with a small number of steps.

The identification information items may be associated with respective beams for transmitting the reference signals. With such a configuration, the base station can recognize a beam that is favorably received by the user equipment, and the base station can properly determine, based on the beam, the beam to be used for transmission to the user equipment.

Further, the base station in one or more embodiments of the present invention is configured as a base station for communicating with user equipment in a radio communication system including the base station and the user equipment, the base station including a transmitter that transmits reference signals associated with a plurality of different identification information items; and a receiver that receives, from the user equipment, a random access signal including a preamble sequence, the preamble sequence corresponding to an identification information item of a specific reference signal received by the user equipment, wherein the transmitter transmits, to the user equipment, a control signal based on the identification information item obtained from the random access signal received by the receiver. With this configuration, for example, in the radio communication system including the base station that implements beam forming and the user equipment, the base station can efficiently determine a favorable beam.

The receiver can receive the random access signal by a radio resource that is associated with the user equipment;

and the transmitter can transmit, to the user equipment, the control signal to which identification information of the user equipment is attached, the identification information of the user equipment being obtained based on the radio resource. With such a configuration, the base station can quickly identify the user equipment that is a sender of the random access signal; and the base station can transmit the control signal (e.g., uplink allocation information) to the user equipment.

The random access signal may be transmitted from the user equipment, as a scheduling request; and the transmitter may transmit, to the user equipment, the control signal including resource allocation information based on the scheduling request. By such a configuration, the user equipment can start uplink data transmission with a small number of steps.

Further, in one or more embodiments of the present invention, there is provided a communication access method to be executed by user equipment that communicates with a base station in a radio communication system including the base station and the user equipment, the method including a reception step of measuring received power of reference signals associated with a plurality of different identification information items, the reference signals being transmitted from the base station, and selecting a specific reference signal based on a measurement result; and a transmission step of transmitting a random access signal including a preamble sequence, the preamble sequence corresponding to the identification information item of the reference signal selected by the reception step.

Further, according to one or more embodiments of the present invention, there is provided a communication method to be executed by a base station that communicates with user equipment in a radio communication system including the base station and the user equipment, the method including a transmission step of transmitting reference signals associated with a plurality of different identification information items; a reception step of receiving, from the user equipment, a random access signal including a preamble sequence, the preamble sequence corresponding to an identification information item of a specific reference signal received by the user equipment; and a control information transmission step of transmitting, to the user equipment, a control signal based on the identification information item obtained from the random access signal received by the reception step.

The functional configuration of each device described in the embodiments may have a configuration that is implemented by executing a program by a CPU (a processor) in user equipment/a base station including the CPU and a memory; may have a configuration that is implemented by hardware, such as a hardware circuit including a logic for the processes described in the embodiments; or may be such that a program and hardware coexists.

One or more embodiments of the present invention are described above; however the disclosed invention is not limited to such an embodiment, and a person ordinarily skilled in the art will appreciate various variations, modifications, alternatives, replacements, and so forth. Specific examples of numerical values are used in the description in order to facilitate understanding of the invention. However, these numerical values are merely an example, and any other appropriate values may be used, except as indicated otherwise. The separations of the items in the above description are not essential to the present invention. Depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. For the convenience of explanation, the user equipment and the base station are described by using the functional block diagrams. However, such a device may be implemented in hardware, software, or combinations thereof. The software to be operated by the processor included in the user equipment, and the software to be operated by the processor included in the base station in accordance with the embodiment of the present invention may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth. The present invention is not limited to the above-described embodiment; and various variations, modifications, alternatives, replacements, and so forth are included in the present invention without departing from the spirit of the present invention. Accordingly, the scope of the invention should be limited only by the attached claims.

This patent application is based upon and claims the benefit of priority of Japanese Patent Application No. 2014-094158 filed on Apr. 30, 2014, the entire contents of which are incorporated herein by reference.

LIST OF REFERENCE SYMBOLS

10: macro base station
12: base station
20: user equipment
121: signal transmitter
122: signal receiver
123 reception quality measurement unit
124: control information generator
201: signal transmitter
202: signal receiver
203: reception quality measurement unit
204: control information storage unit
205: PRACH signal generator

The invention claimed is:
1. A terminal comprising:
a controller that measures received power of at least one reference signal of a plurality of reference signals, and that selects a specific reference signal based on a measurement result; and
a transmitter that transmits a random access preamble corresponding to the specific reference signal selected based on the measurement result obtained by the terminal,
wherein the reference signals are associated with identification information items,
wherein the identification information items are associated with respective beams by which the reference signals are transmitted,
wherein the controller narrows down candidates of beams to monitor based on auxiliary information, which is not the reference signal, received from a base station, and
wherein the controller receives an uplink (UL) grant transmitted from the base station by a beam of a beam ID specified by the random access preamble.

2. The terminal according to claim 1, wherein the transmitter transmits the random access preamble by using a radio resource associated with the terminal.

3. The terminal according to claim 2, wherein the random access preamble is transmitted to the base station as a scheduling request.

4. The terminal according to claim 1, wherein the random access preamble is transmitted to the base station as a scheduling request.

5. The terminal according to claim 1, wherein the terminal receives radio resource allocation information for uplink data transmission after the transmitter transmits the random access preamble.

6. A communication access method to be executed by terminal, the method comprising:
   measuring received power of at least one reference signal of a plurality of reference signals, and selecting a specific reference signal based on a measurement result; and
   transmitting a random access preamble corresponding to the specific reference signal selected based on the measurement result obtained by the terminal,
   wherein the reference signals are associated with identification information items,
   wherein the identification information items are associated with respective beams by which the reference signals are transmitted,
   wherein the method further comprised narrowing down candidates of beams to monitor based on auxiliary information, which is not the reference signal, received from a base station,
   and
   wherein the terminal receives an uplink (UL) grant transmitted from the base station by a beam of a beam ID specified by the random access preamble.

7. A system comprising:
   a terminal comprising:
      a controller that measures received power of at least one reference signal of a plurality of reference signals, and that selects a specific reference signal based on a measurement result; and
      a first transmitter that transmits a random access preamble corresponding to the specific reference signal selected based on the measurement result obtained by the terminal,
      wherein the reference signals are associated with identification information items,
      wherein the identification information items are associated with respective beams by which the reference signals are transmitted,
      and
      wherein the controller receives an uplink (UL) grant transmitted from a base station by a beam of a beam ID specified by the random access preamble, and
   the base station comprising:
      a second transmitter that transmits the plurality of reference signals, and
      a receiver that receives the random access preamble corresponding to the specific reference signal selected based on the measurement result obtained by the terminal, and
   wherein the controller narrows down candidates of beams to monitor based on auxiliary information, which is not the reference signal, received from the base station.

* * * * *

UNITED STATES PATENT AND TRADEMARK OFFICE
CERTIFICATE OF CORRECTION

| | |
|---|---|
| PATENT NO. | : 11,582,724 B2 |
| APPLICATION NO. | : 15/306370 |
| DATED | : February 14, 2023 |
| INVENTOR(S) | : Yoshihisa Kishiyama |

It is certified that error appears in the above-identified patent and that said Letters Patent is hereby corrected as shown below:

On the Title Page

Item (30) Foreign Application Priority Data, the date "April 30, 2013" should read --April 30, 2014--.

Signed and Sealed this
Thirtieth Day of April, 2024

Katherine Kelly Vidal
*Director of the United States Patent and Trademark Office*